(12) United States Patent
Kato

(10) Patent No.: US 10,816,330 B1
(45) Date of Patent: Oct. 27, 2020

(54) SHAPE MEASURING APPARATUS

(71) Applicant: MITUTOYO CORPORATION, Kanagawa (JP)

(72) Inventor: Yoshiaki Kato, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/818,400

(22) Filed: Mar. 13, 2020

(30) Foreign Application Priority Data

Apr. 12, 2019 (JP) .................................. 2019-076219

(51) Int. Cl.
*G01B 11/24* (2006.01)
*G01B 11/00* (2006.01)
(Continued)

(52) U.S. Cl.
CPC ............ *G01B 11/24* (2013.01); *G01B 11/002* (2013.01); *G01B 11/007* (2013.01); *G01B 11/2518* (2013.01); *G01B 11/30* (2013.01)

(58) Field of Classification Search
CPC ... G01B 11/002; G01B 11/005; G01B 11/007; G01B 11/16; G01B 11/165; G01B 11/167; G01B 11/168; G01B 11/22; G01B 11/24; G01B 11/2408; G01B 11/2416; G01B 11/2425; G01B 11/25; G01B 11/2509; G01B 11/2513; G01B 11/2518; G01B 11/2522; G01B 11/30; G01B 11/303; G01B 11/306
(Continued)

(56) References Cited

U.S. PATENT DOCUMENTS 4,681,451 A * 7/1987 Guerra ................. G11B 5/6005
356/600
4,743,770 A * 5/1988 Lee ........................ G01B 11/24
250/559.09
(Continued)

FOREIGN PATENT DOCUMENTS

JP 2017-032297 A 2/2017

OTHER PUBLICATIONS

U.S. Appl. No. 16/823,953 to Yoshiaki Kato, which was filed on Mar. 19, 2020.

*Primary Examiner* — Gordon J Stock, Jr.
(74) *Attorney, Agent, or Firm* — Greenblum & Bernstein, P.L.C.

(57) ABSTRACT

A head provided to a shape measuring apparatus includes a translucent stylus head that displaces integrally with a light source and a photoreceiver, and is arranged between the light source and the photoreceiver. The stylus head includes an incident portion that causes the light from the light source to be incident on an interior of the stylus head, a reflection portion that totally reflects the incident light, and a light emission portion that emits the light that is totally reflected toward the photoreceiver. Evanescent light is generated at the measurement surface by the light that is totally reflected by the total reflection surface. The stylus head brings the measurement surface and a surface of a measurable object to face each other, separates the measurement surface from the surface of the measurable object, and is arranged such that the evanescent light reaches the surface of the measurable object.

8 Claims, 9 Drawing Sheets

(51) Int. Cl.
*G01B 11/25* (2006.01)
*G01B 11/30* (2006.01)

(58) Field of Classification Search
USPC .................................................. 356/600–613
See application file for complete search history.

(56) References Cited

U.S. PATENT DOCUMENTS

| | | | | |
|---|---|---|---|---|
| 5,025,147 | A * | 6/1991 | Durig | G01B 11/306 250/216 |
| 5,028,132 | A * | 7/1991 | Hickel | G01N 21/553 356/256 |
| 5,126,872 | A * | 6/1992 | Birkle | G01N 21/952 356/24 |
| 5,225,690 | A * | 7/1993 | Sakai | G01B 11/306 250/559.09 |
| 5,410,410 | A * | 4/1995 | Yamazaki | G01B 11/26 356/601 |
| 5,666,197 | A * | 9/1997 | Guerra | B82Y 10/00 356/512 |
| 6,753,970 | B1 * | 6/2004 | Neumann | G01Q 60/22 356/600 |
| 7,319,528 | B2 * | 1/2008 | Hidaka | G01Q 30/02 250/201.3 |
| 7,973,942 | B2 * | 7/2011 | Iyoki | G01Q 20/02 356/614 |
| 9,759,584 | B2 | 9/2017 | Kato | |
| 2009/0290146 | A1 * | 11/2009 | Petersen | A61B 5/0064 356/72 |
| 2018/0087900 | A1 * | 3/2018 | Paskover | G01N 21/9501 |
| 2020/0124977 | A1 * | 4/2020 | D'Achard van Enschut | G03F 1/84 |

* cited by examiner

RELATED ART

SHAPE MEASURING APPARATUS

CROSS-REFERENCE TO RELATED APPLICATIONS

The present application claims priority under 35 U.S.C. § 119 of Japanese Application No. 2019-076219, filed on Apr. 12, 2019, the disclosure of which is expressly incorporated by reference herein in its entirety.

BACKGROUND OF THE INVENTION

1. Field of the Invention

The present invention relates to a shape measuring apparatus.

2. Description of Related Art

Conventionally, a shape measuring apparatus is known in which a contact pin (stylus head) contacts a surface of a translucent measured object to measure a shape of the surface of the measured object based on a displacement amount of the contact pin in a direction perpendicular to the surface of the measured object. A shape measuring apparatus of this kind may damage the surface of the measured object with the contact pin due to the contact of the contact pin with the surface of the measured object. Thus, a shape measuring apparatus is known in which a shape of a surface of a measured object is measured by using light, without having a contact pin contact the surface of the measured object. A shape measuring apparatus of this kind includes a head and a detector. The head includes a light source emitting light toward the surface of the measured object, and a photoreceiver that displaces integrally with the light source and receives light through the surface of the measured object. The detector detects the shape of the surface of the measured object based on the light received by the photoreceiver.

FIG. 9 illustrates a conventional shape measuring apparatus 100. In this example, a measured object W is a translucent material such as glass, and is placed on a measurement stand D, as shown in FIG. 9, and when a light source 300 in the shape measuring apparatus 100 emits light toward a surface H of the measured object W, light reflected by the surface H of the measured object W (illustrated in a dashed arrow) and light transiting the measured object W (illustrated in a solid arrow) are generated. The light transiting the measured object W (illustrated in the solid arrow) is reflected by the measurement stand D and travels again through the measured object W toward a photoreceiver 400. The photoreceiver 400 winds up receiving light rays having different intensities: the light reflected by the measurement stand D (illustrated in a solid arrow), and the light reflected by the surface H of the measured object W (illustrated in a dashed arrow). A detector (not shown in the drawings) then detects a shape of the surface H of the measured object W based on a plurality of light rays having respectively different light intensities. Therefore, the detector cannot accurately measure the surface H of the measured object W from the light reflected by the measurement stand D illustrated in the solid arrow.

To address the issue mentioned above, a surface shape measuring apparatus (shape measuring apparatus) described in Japanese Patent Laid-open Publication No. 2017-32297 includes a laser light source (light source) emitting laser light toward a surface of a translucent measured object and a laser displacement gauge (photoreceiver and detector) that receives the laser light reflected by the surface of the measured object and measures displacement. Also, a measurement stand used together with the surface shape measuring apparatus has a recess at least below a position corresponding to a measurement position of the measured object where the laser light is emitted, the recess being recessed more than other regions that do not contain the measurement position. The recess inhibits the light transiting the measured object configured by a translucent material from being reflected by the measurement stand and inhibits the light transiting the measured object from reflecting toward the laser displacement gauge. Therefore, the surface shape measuring apparatus can detect the shape of the surface of the measured object using the light reflecting off the surface of the measured object.

However, the surface shape measuring apparatus described in Japanese Patent Laid-open Publication No. 2017-32297 needs to include on the opposite side a measurement stand that has a recess, with the translucent measured object interposed between the two. In addition, most of the laser light emitted from the laser light source transits the measured object configured by the translucent material, and therefore, the laser displacement gauge cannot obtain sufficient reflected light that is reflected by the surface of the translucent measured object, and sufficient displacement measurement cannot be performed.

SUMMARY OF THE INVENTION

The present invention provides a shape measuring apparatus that can measure a shape of a measured object with a high degree of accuracy using light and without contacting the surface of the measured object.

A shape measuring apparatus of the present invention includes a head and a detector. The head includes a light source emitting light toward a surface of a measured object, and a photoreceiver that displaces integrally with the light source and receives light through the surface of the measured object. The detector detects a shape of the surface of the measured object based on the light received by the photoreceiver. The head includes a translucent stylus head that displaces integrally with the light source and the photoreceiver, and is arranged between the light source and the photoreceiver. The stylus head includes an incident portion that causes the light from the light source to be incident on an interior of the stylus head, a reflection portion that totally reflects the incident light from the incident portion, and a light emission portion that emits the light that is totally reflected by the reflection portion toward the photoreceiver. The reflection portion includes a total reflection surface that totally reflects light from the light source, and a measuring surface on the opposite side from the total reflection surface, arranged facing the surface of the measured object. The stylus head is arranged so as to separate the measuring surface from the surface of the measured object and also such that evanescent light generated at the measuring surface in a direction toward the opposite side from the total reflection surface reaches the surface of the measured object. The detector detects the shape of the measured object based on changes in the light received by the photoreceiver and caused by the evanescent light that reaches the surface of the measured object.

According to the present invention, the head includes the translucent stylus head that is arranged between the light source and the photoreceiver. Of the incident portion, the reflection portion, and the light emission portion belonging to the stylus head, measurement of the shape of the surface of the measured object can be performed using evanescent light generated at the measuring surface of the reflection portion. In this example, when light is totally reflected in a medium having a high refractive index such as glass, the evanescent light is a specific type of light that leaks out toward a medium having a low refractive index such as air. The light emitted from the light emission portion of the stylus head changes according to the distance over which the evanescent light reaches the surface of the measured object. In other words, the photoreceiver can measure the shape of the surface of the measured object from a state of the light, which is changed by the evanescent light. Therefore, without contacting the surface of the measured object, the shape measuring apparatus can measure the shape of the measured object with a high degree of accuracy using the evanescent light generated at the measuring surface of the stylus head.

At this time, it is preferred that the shape measuring apparatus includes a controller that controls relative displacement of the measured object and the head, and a scanner that scans by displacing the head relative to the measured object in a predetermined scanning direction; the controller includes a scan controller that controls the scanner; and the detector detects the shape of the surface of the measured object based on the intensity of the light received by the photoreceiver.

According to this configuration, with the scanner that scans by displacing the head provided with the stylus head relative to the measured object in the predetermined scanning direction, the shape measuring apparatus can measure the shape of the measured object based on the intensity of light by simply scanning in the predetermined scanning direction, without making contact with the surface of the measured object.

At this time, it is preferred that the shape measuring apparatus is provided with the measured object that is translucent, the controller that controls relative displacement of the measured object and the head, and a separation adjuster that adjusts separation between the measuring surface of the stylus head and the surface of the measured object by displacing the head; the controller includes a separation adjustment controller that controls the separation adjuster, and a feedback portion that feeds the intensity of the light received by the photoreceiver back to the separation adjustment controller; the separation adjustment controller adjusts separation between the measuring surface and the surface of the measured object by controlling the separation adjuster such that the intensity of the light received by the photoreceiver is maintained at a predetermined value by displacing the head in a direction away from the surface of the measured object when the intensity of the light received by the photoreceiver is lower than the predetermined value, and displacing the head in a direction approaching the surface of the measured object when the intensity of the light received by the photoreceiver is greater than the predetermined value; and the detector detects the shape of the surface of the measured object based on a displacement amount of the separation adjuster with respect to the surface of the measured object.

In this example, when the medium having a high refractive index such as glass is brought closer to evanescent light that is generated in the medium having a low refractive index such as air, a portion of light that is incident through the incident portion of the stylus head propagates and transits out to the medium having the high refractive index through the evanescent light that reaches the surface of the medium having the high refractive index. The feature of light transiting from a first translucent material (stylus head according to the present invention) to a second translucent material (measured object) through the evanescent light in this way is called a tunneling effect. Through the tunneling effect, when light transits from the first material to the second material, the intensity of the light that is totally reflected by the total reflection surface of the stylus head and reaches the photoreceiver is decreased.

According to the configuration of the present invention taking advantage of this feature, the measured object is translucent, and the shape measuring apparatus includes a separation adjuster that is controlled by a separation adjustment controller and a feedback portion. The separation adjustment controller can keep the light received by the photoreceiver constant by displacing the head in a direction away from the surface of the measured object when the intensity of the light received by the photoreceiver is lower than the predetermined value, and displacing the head in a direction approaching the surface of the measured object when the intensity of the light received by the photoreceiver is greater than the predetermined value. The detector detects the shape of the surface of the measured object based on the displacement amount of the separation adjuster with respect to the surface of the measured object. Therefore, the shape measuring apparatus can measure the shape of the surface of the measured object with a high degree of accuracy using light without making contact with the surface of the measured object while keeping a constant separation distance between the measuring surface of the stylus head and the surface of the measured object. In addition, even if there are protrusions or depressions on the surface of the measured object, the shape measuring apparatus performs measurement, with the separation adjuster that is controlled by the feedback portion and the separation adjustment controller, while keeping the separation distance between the measuring surface of the stylus head and the surface of the measured object constant. Therefore, the shape measuring apparatus can adapt to measured objects having various shapes and stably measure the shape of the measured object.

At this time, the light source is preferably a laser light source that emits laser light.

With such a configuration, the light source is the laser light source emitting laser light, and therefore the photoreceiver can receive the light reflected by the surface of the measured object more efficiently compared to when another light source is used.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
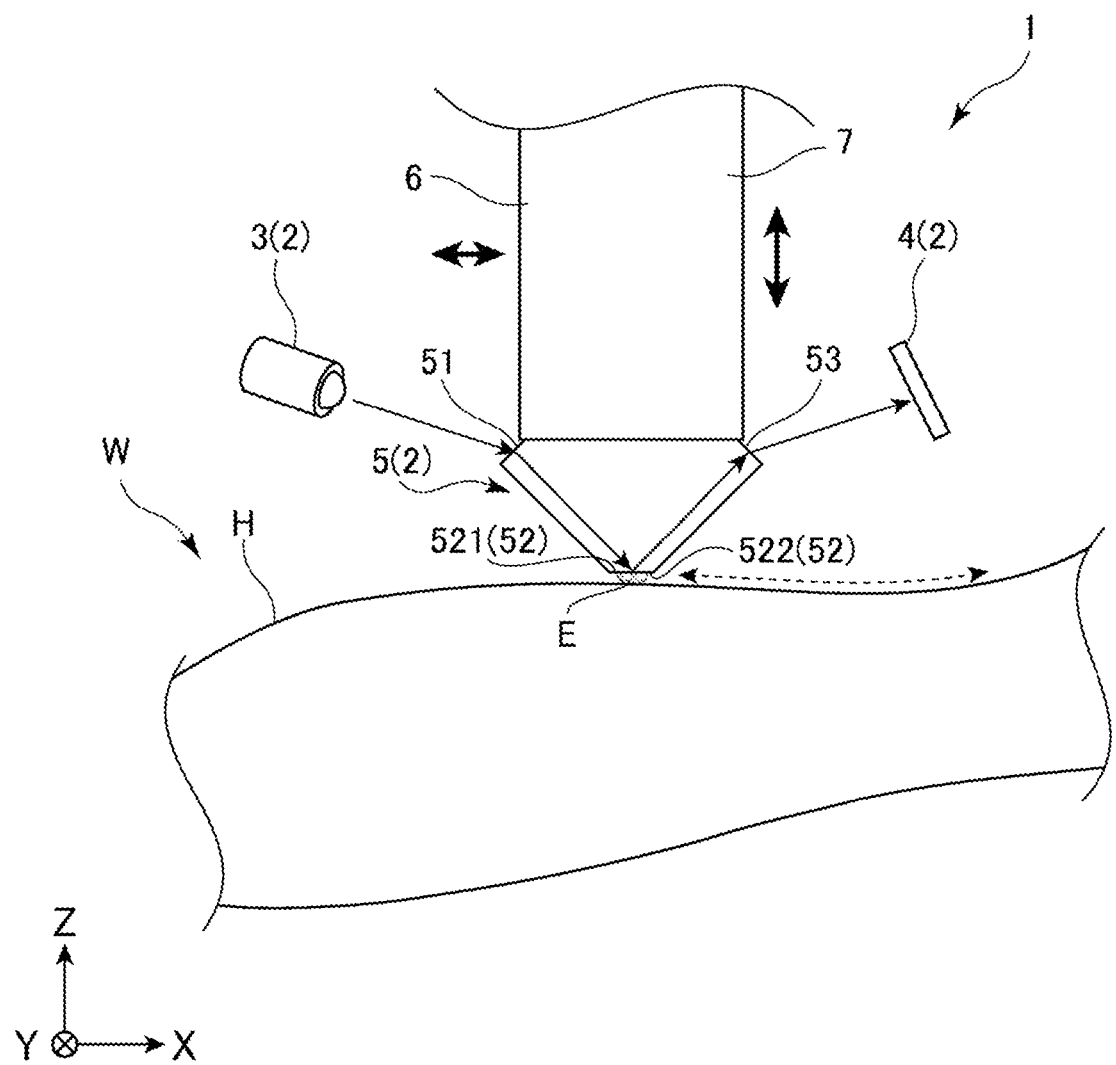
FIG. 1 illustrates a shape measuring apparatus according to a first embodiment of the present invention.

Hereafter, a first embodiment of the present invention is described with reference to FIGS. 1 to 4. FIG. 1 illustrates a shape measuring apparatus 1 according to a first embodiment of the present invention. As shown in FIG. 1, the shape measuring apparatus 1 includes a head 2 that measures a shape of a surface H of a measured object (measurable object) W, and is a surface shape measuring apparatus that measures a shape of a planar surface H of a substantially plate-shaped measured object W. The measured object W is glass that is translucent, for example. The measured object W is a window glass of a vehicle, for example, which is fixed so as not to shift during measurement. The shape measuring apparatus 1 measures the shape of the surface H of the glass (measured object W) using light.

The head 2 includes a light source 3 emitting light toward the surface H of the measured object W and a photoreceiver 4 that displaces integrally with the light source 3 and receives light through the surface H of the measured object W. The light source 3 is a laser light source that emits laser light. By employing the laser light source as the light source 3, the photoreceiver 4 can receive the light reflected by the surface H of the measured object W more efficiently compared to when another light source is used. The light source 3 is not limited to the laser light source, and an arbitrary light source, such as a light emitting diode (LED) may instead be employed. A photo diode array (PDA) is employed as the photoreceiver 4. The photoreceiver 4 is not limited to the PDA, and an arbitrary detection device such as a position sensitive detector (PSD) or a charge-coupled device (CCD) may be employed as long as the detection device can receive the light reflected by the surface H of the measured object W.

The head 2 further includes a translucent stylus head 5 that displaces integrally with the light source 3 and the photoreceiver 4, and is arranged between the light source 3 and the photoreceiver 4. The stylus head 5 is formed with glass, for example. The stylus head 5 includes an incident portion 51 that causes the light from the light source 3 to be incident on an interior of the stylus head 5, a reflection portion 52 that totally reflects the incident light from the incident portion 51, and a light emission portion 53 that emits the light totally reflected by the reflection portion 52 toward the photoreceiver 4. The incident portion 51, the reflection portion 52, and the light emission portion 53 have a planar shape. However, those portions can be formed in any shape such as a curved surface or a wavy shape, as long as the incident portion can cause the light from the light source to be incident on the interior of the stylus head, the reflection portion can totally reflect the light from the incident portion, and the light emission portion can emit the light reflected by the reflection portion toward the photoreceiver. Also, in all drawings including FIG. 1, an optical path of light that is emitted from the light source 3, that is incident through the incident portion 51 of the stylus head 5, that is reflected by the reflection portion 52, that is emitted through the light emission portion 53, and that travels toward the photoreceiver 4 is illustrated in a solid arrow.

The reflection portion 52 includes a total reflection surface 521 that totally reflects light from the light source 3, and a measuring surface (measurement surface) 522 which is on the opposite side from the total reflection surface 521 and is arranged facing the surface H of the measured object W. A medium between the measuring surface 522 and the surface H of the measured object W is air, which is a medium having a refractive index lower than the stylus head 5 and the measured object W. In this example, the light that is incident inside the stylus head 5 through the incident portion 51 is totally reflected by the total reflection surface 521 of the reflection portion 52, and this generates evanescent light E at the measuring surface 522 in the air on the opposite side from the total reflection surface 521. The stylus head 5 brings the measuring surface 522 and the surface H of the measured object W to face each other, separates the measuring surface 522 from the surface H of the measured object W, and is arranged such that the evanescent light E reaches the surface H of the measured object W.

In addition, the shape measuring apparatus 1 includes a scanner 6 that scans by displacing the head 2 relative to the measured object W in a predetermined scanning direction, and a separation adjuster 7 that adjusts separation between the measuring surface 522 of the stylus head 5 and the surface H of the measured object W by displacing relative to the head 2 in a Z direction that is substantially perpendicular to the surface H of the measured object W. In this example, the predetermined scanning direction refers to, with respect to the measured object, a predetermined linear direction (one-dimensional direction) or a direction parallel to a predetermined plane (two-dimensional direction), examples of which include a direction along a surface (side surface) of a measured object formed in a columnar shape such as a glass rod, a direction along a surface (inner surface) of a measured object formed in a cylindrical shape such as a glass tube or a hole, and a direction along a surface of a measured object formed in a spherical shape such as a lens or a ball.

In the present embodiment, the scanner 6 scans by displacing the head 2 in a direction orthogonal to the Z direction, which is a direction that is substantially perpendicular to the surface H of the measured object W, and an XY plane direction, which is a direction that is substantially parallel to the measuring surface 522. The scanner 6 and the separation adjuster 7 are motors that displace the head 2 with respect to the surface H of the measured object W. The scanner 6 displaces the head 2 in the XY plane direction, and the separation adjuster 7 displaces the head 2 in the Z direction by adjusting a separation distance between the measuring surface 522 and the surface H of the measured object W. Therefore, the shape measuring apparatus 1 can displace the head 2 along the surface H of the measured object W as illustrated in a dashed arrow in FIG. 1. The shape measuring apparatus 1 can perform measurement within a mobility range of the scanner 6 and the separation adjuster 7.

In all the drawings, an X direction is the direction orthogonal to a direction substantially perpendicular to the surface H of the measured object W, the direction substantially parallel to the measuring surface 522, and the direction in which the scanner 6 moves in the present embodiment (left-right direction on the plane of the drawing sheet). The Z direction is a direction substantially perpendicular to the surface H of the measured object W and is a displacement axis direction of the separation adjuster 7 (top-bottom direction on the plane of the drawing sheet). A Y direction is a direction orthogonal to the X direction and the Z direction (depth direction on the plane of the drawing sheet). The following description may simply refer to the X direction, Y direction, and Z direction.

Figure 2:
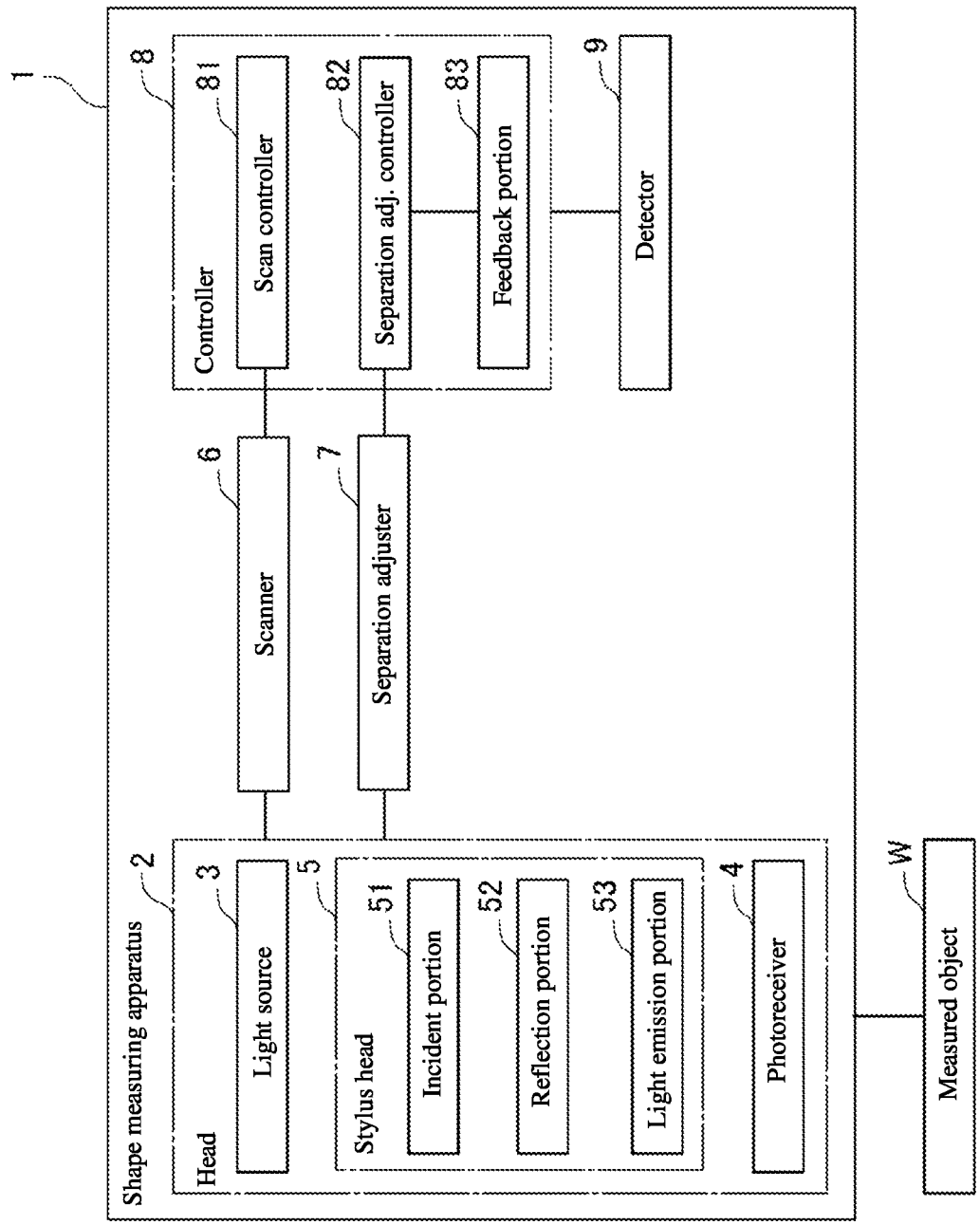
FIG. 2 is a block diagram of the shape measuring apparatus.

FIG. 2 is a block diagram illustrating the shape measuring apparatus 1. The shape measuring apparatus 1, as shown in FIG. 2, further includes a controller 8 that controls relative displacement of the measured object W and the head 2, and a detector 9 that detects the shape of the surface H of the measured object W based on the light received by the photoreceiver 4. The controller 8 and the detector 9 are a microcomputer, for example. The controller and the detector are not limited to the microcomputer and may instead be a personal computer that is externally connected, for example, and can be configured by any component as long as the relative displacement between the measured object and the head can be controlled and the shape of the measured object can be detected based on the light received by the photoreceiver.

The controller 8 includes a scan controller 81 that controls the scanner 6, a separation adjustment controller 82 that controls the separation adjuster 7, and a feedback portion 83 that feeds the intensity of the light received by the photoreceiver 4 back to the separation adjustment controller 82. The scan controller 81 controls the scanner 6, and in the present embodiment, performs scans by displacing the head 2 in the X direction that serves as a predetermined scanning direction with respect to the measured object W. The separation adjustment controller 82 adjusts separation between the measuring surface 522 and the surface H of the measured object W by controlling the separation adjuster 7 such that the intensity of the light received by the photoreceiver 4 is maintained at a predetermined value by displacing the head 2 in a direction away from the surface H of the measured object W when the intensity of the light received by the photoreceiver 4 is lower than the predetermined value, and displacing the head 2 in a direction approaching the surface H of the measured object W when the intensity of the light received by the photoreceiver is greater than the predetermined value. The detector 9 detects the shape of the surface H of the measured object W based on a displacement amount of the separation adjuster 7 with respect to the surface H of the measured object W.

Specifically, when the measured object W (the medium having a high refractive index such as glass) is brought closer to the evanescent light E that is generated in the air (the medium having a low refractive index), a portion of the light that is incident from the incident portion 51 of the stylus head 5 propagates and transits out to the measured object W through the evanescent light E that is generated at the measuring surface 522. This feature is called a tunneling effect. When the light transits from the stylus head 5 (a first translucent material) to the measured object W (a second translucent material) through the evanescent light E, the light is totally reflected by the total reflection surface 521, and the intensity of the light that is emitted through the light emission portion 53 and received by the photoreceiver 4 is decreased. At this time, the narrower the separation distance is between the measuring surface 522 of the stylus head 5 and the surface H of the measured object W, the more the light transiting the measured object W increases and the intensity of the light received by the photoreceiver 4 is decreased. The separation adjustment controller 82 calculates the separation distance between the measuring surface 522 and the surface H of the measured object W based on the strength of the light intensity received by the photoreceiver 4, and adjusts the separation distance by displacing the head 2 so as to keep the separation distance between the measuring surface 522 and the surface H of the measured object W constant. The separation adjustment controller 82 controls the displacement of the head 2 in order to keep the intensity of the light received by the photoreceiver 4 constant, and therefore, the detector 9 detects the shape of the surface H of the measured object W based on the displacement amount of the separation adjuster 7.

Figure 3A:
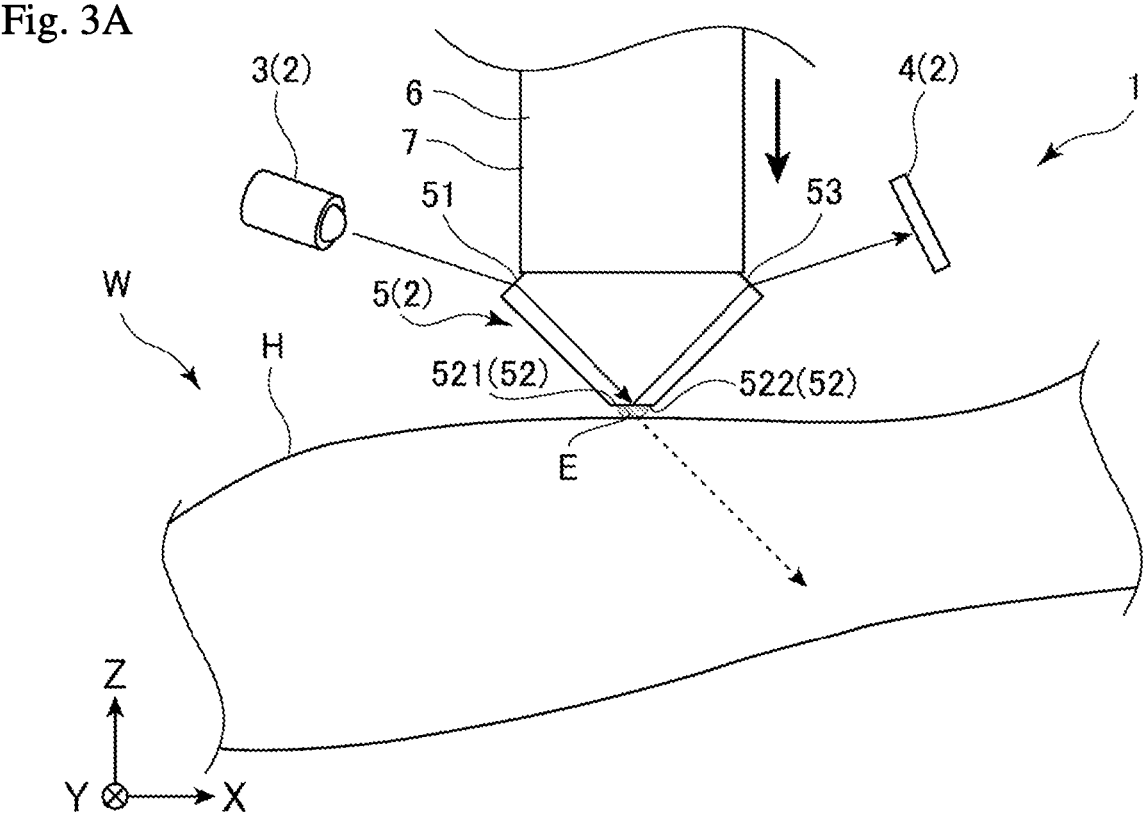
FIGS. 3A and 3B illustrate a method of measuring a shape of a surface of a measured object in the shape measuring apparatus.
Figure 3B:
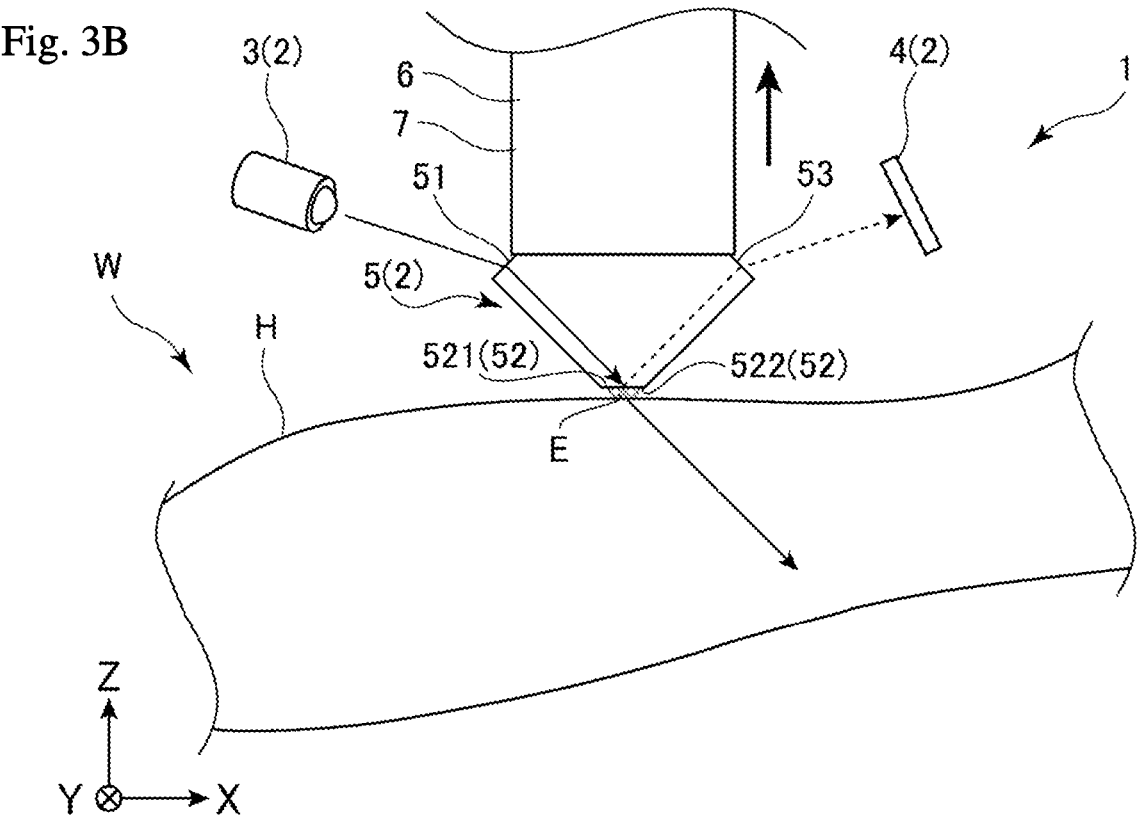
Figure 4:
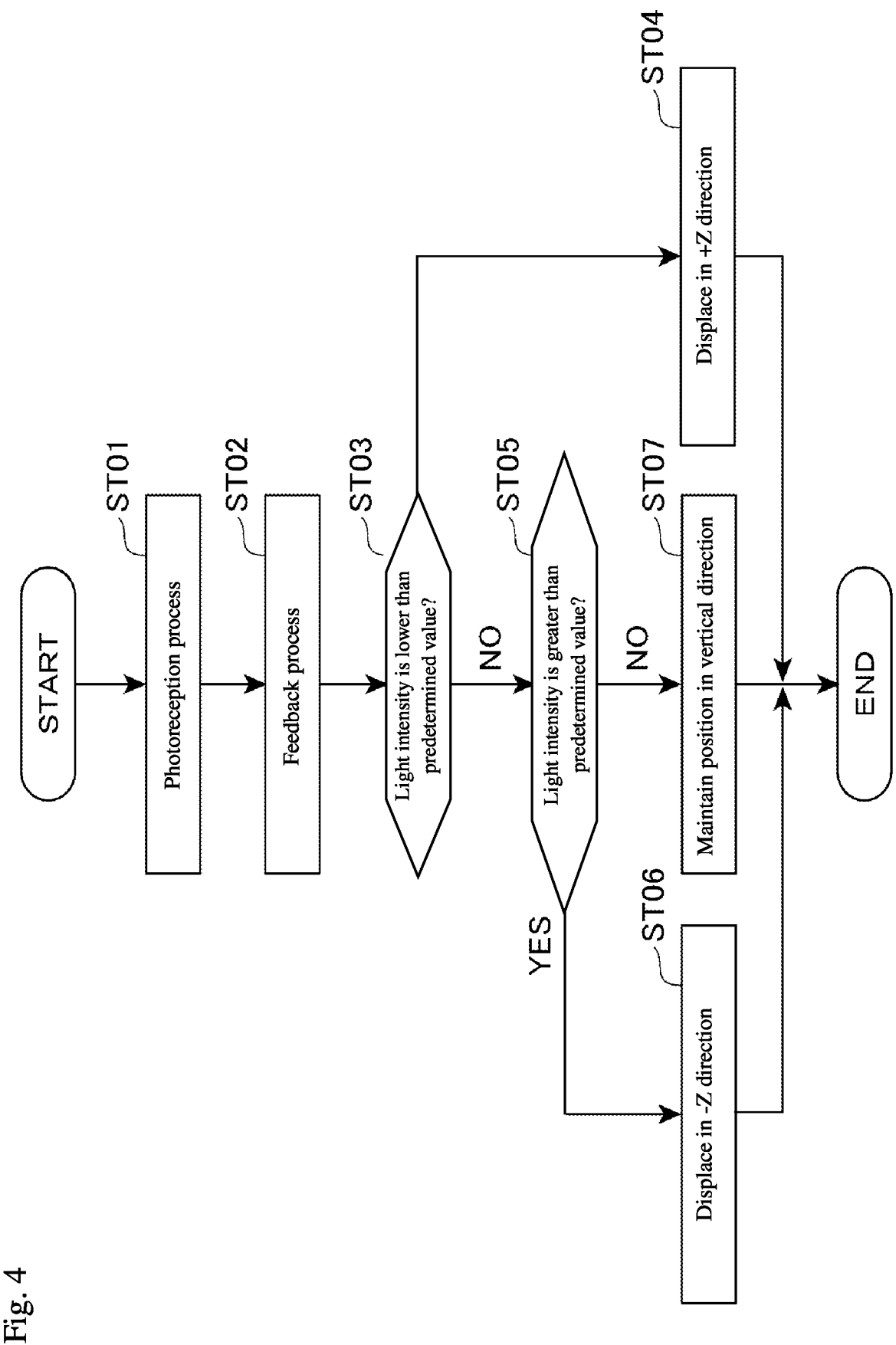
FIG. 4 is a flow chart illustrating a method of measuring the shape of the surface of the measured object in the shape measuring apparatus.

FIGS. 3A and 3B illustrate a method of measuring the shape of the surface H, of the measured object W in the shape measuring apparatus 1. Specifically, FIG. 3A shows when the measuring surface 522 of the stylus head 5 and the surface H of the measured object W are kept at a constant separation distance, and the photoreceiver 4 receives light with the predetermined intensity. FIG. 3B shows when light propagates and transits out to the measured object W because of the tunneling effect of the evanescent light E and the photoreceiver 4 receives light having lower intensity than the predetermined intensity. FIG. 4 is a flow chart illustrating the method of measuring the shape of the surface H of the measured object W in the shape measuring apparatus 1. Hereafter, the method of measuring the shape of the surface H of the measured object W in the shape measuring apparatus 1 is described with reference to FIGS. 3A, 3B, and 4.

First, as shown in FIG. 3A, the shape measuring apparatus 1 emits light toward the incident portion 51 of the stylus head 5. The light that is incident inside the stylus head 5 through the incident portion 51 is totally reflected by the total reflection surface 521 of the reflection portion 52 and is emitted toward the photoreceiver 4 through the light emission portion 53. At this time, the evanescent light E is generated in the air from the measuring surface 522. Next, as shown in FIG. 4, the photoreceiver 4 performs a photoreception step which receives the light emitted from the light emission portion 53 (step ST01). When the photoreception step is performed, the feedback portion 83 performs a feedback step that feeds the intensity of the light received by the photoreceiver 4 back to the separation adjustment controller 82 (step ST02).

Based on the feedback obtained in the feedback step, the separation adjustment controller 82 determines whether the intensity of the light received by the photoreceiver 4 is lower than a predetermined value (step ST03). In this example, as shown in FIG. 3A, the predetermined value is the intensity of the light received by the photoreceiver 4 when a small amount of light (illustrated in a dashed arrow) among the light totally reflected by the total reflection surface 521 propagates and transits through the evanescent light E to the measured object W because of the tunneling effect. A case where the intensity of the light received by the photoreceiver 4 is lower than the predetermined value is, as shown FIG. 3B, one where the measuring surface 522 is close to the surface H of the measured object W and the separation distance becomes narrow, whereby the light (illustrated in the solid arrow) which propagates and transits through the evanescent light E and inside the measured object W is increased compared to FIG. 3A and the intensity of the light received by the photoreceiver 4 is decreased.

As shown in FIG. 4, when it is determined that the intensity of the light received by the photoreceiver 4 is lower than the predetermined value (YES in step ST03), the measuring surface 522 is close to the surface H of the measured object W and the separation distance is narrow. Therefore, the separation adjustment controller 82 displaces the head 2 in the +Z direction, which is a direction away from the surface H of the measured object W, until the light received by the photoreceiver 4 reaches the predetermined intensity (step ST04). By adjusting the separation distance between the measuring surface 522 of the stylus head 5 and the surface H of the measured object W, the amount of light propagating and transiting out to the measured object W is decreased because of the tunneling effect and, as shown in FIG. 3A, the photoreceiver 4 can receive light having the predetermined intensity.

As shown in FIG. 4, when it is determined that the intensity of the light received by the photoreceiver 4 is not lower than the predetermined value (NO in step ST03), the separation adjustment controller 82 next determines whether the intensity of the light received by the photoreceiver 4 is greater than the predetermined value (step ST05). In this example, a case where the intensity of the light received by the photoreceiver 4 is greater than the predetermined value is one where the evanescent light E does not reach the surface H of the measured object W, or one where the amount of light propagating and transiting through the evanescent light E to the measured object W is extremely small and the light received by the photoreceiver 4 is greater than light having the intensity of the predetermined value.

When the separation adjustment controller 82 determines that the intensity of the light received by the photoreceiver 4 is greater than the predetermined value (YES in step ST05), the measuring surface 522 is away from the surface H of the measured object W causing the separation distance to be greater, and therefore, the separation adjustment controller 82 displaces the head 2 in the −Z direction, which is a direction in which the measuring surface 522 approaches the surface H of the measured object W (step ST06). By adjusting the separation distance between the measuring surface 522 of the stylus head 5 and the surface H of the measured object W, the amount of light propagating and transiting out to the measured object W is increased because of the tunneling effect and, as shown in FIG. 3A, the photoreceiver 4 can receive light having the predetermined intensity.

As shown in FIG. 4, when the separation adjustment controller 82 determines that the intensity of the light received by the photoreceiver 4 is not greater than the predetermined value (NO in step ST05), the intensity of the light received by the photoreceiver 4 is the predetermined value and there is no need to adjust the separation distance between the measuring surface 522 of the stylus head 5 and the surface H of the measured object W. Therefore, the separation adjustment controller 82 does not displace the head 2 and maintains the position in the Z direction, which is the vertical direction (step ST07). The detector 9 detects the shape of the surface H of the measured object W based on the displacement amount of the separation adjuster 7 in the Z direction between steps ST03 and ST07. The shape measuring apparatus 1 performs steps ST01 to ST07 at a predetermined timing when the head 2 is displaced by the scanner 6, and measures the shape of the surface H of the translucent measured object W based on a status of separation distance adjustments made by the separation adjustment controller 82 between the measuring surface 522 of the stylus head 5 and the surface H of the measured object W.

In this way, the following effects and advantages can be achieved according to the first embodiment. (1) The head 2 includes the translucent stylus head 5 that is arranged between the light source 3 and the photoreceiver 4, and of the incident portion 51, reflection portion 52, and light emission portion 53 that are provided to the stylus head 5, the shape of the surface H of the measured object W can be measured using the evanescent light E that is generated at the measuring surface 522 of the reflection portion 52. The photoreceiver 4 can measure the shape of the surface H of the measured object W from a state of the light that changes due to the evanescent light E. Therefore, the shape measuring apparatus 1 can measure the shape of the surface H of the measured object W with a high degree of accuracy using the evanescent light E that is generated at the measuring surface 522 of the stylus head 5, without making contact with the surface H of the measured object W.

(2) The shape measuring apparatus 1 includes the separation adjuster 7 that is controlled by the separation adjustment controller 82 and the feedback portion 83. The separation adjustment controller 82 can keep the light received by the photoreceiver 4 constant by displacing the head 2 in the +Z direction, which is a direction away from the surface H of the measured object W, when the intensity of the light received by the photoreceiver 4 is lower than the predetermined value, and displacing the head 2 in the −Z direction, which is a direction approaching the surface H of the measured object W, when the intensity of the light received by the photoreceiver 4 is greater than the predetermined value. The detector 9 detects the shape of the surface of the measured object based on the displacement amount of the separation adjuster 7 with respect to the surface H of the measured object W. Therefore, the shape measuring apparatus 1 can, while keeping a constant separation distance between the measuring surface 522 of the stylus head 5 and the surface H of the measured object W, measure the shape of the surface H of the measured object W with a high degree of accuracy using light, without making contact with the surface H of the measured object W.

(3) Even if there are protrusions or depressions on the surface H of the measured object W, the shape measuring apparatus 1 uses the separation adjuster 7 that is controlled by the feedback portion 83 and the separation adjustment controller 82 to perform measurement while keeping the constant separation distance between the measuring surface 522 of the stylus head 5 and the surface H of the measured object W. Therefore, the shape measuring apparatus 1 can handle measured objects having various shapes and stably measure the shape of the surface H of the measured object W. (4) The light source 3 is a laser light source emitting laser light, and therefore, the photoreceiver 4 can receive the light reflected by the surface H of the measured object W more efficiently compared to when another light source is used.

Second Embodiment

Figure 5:
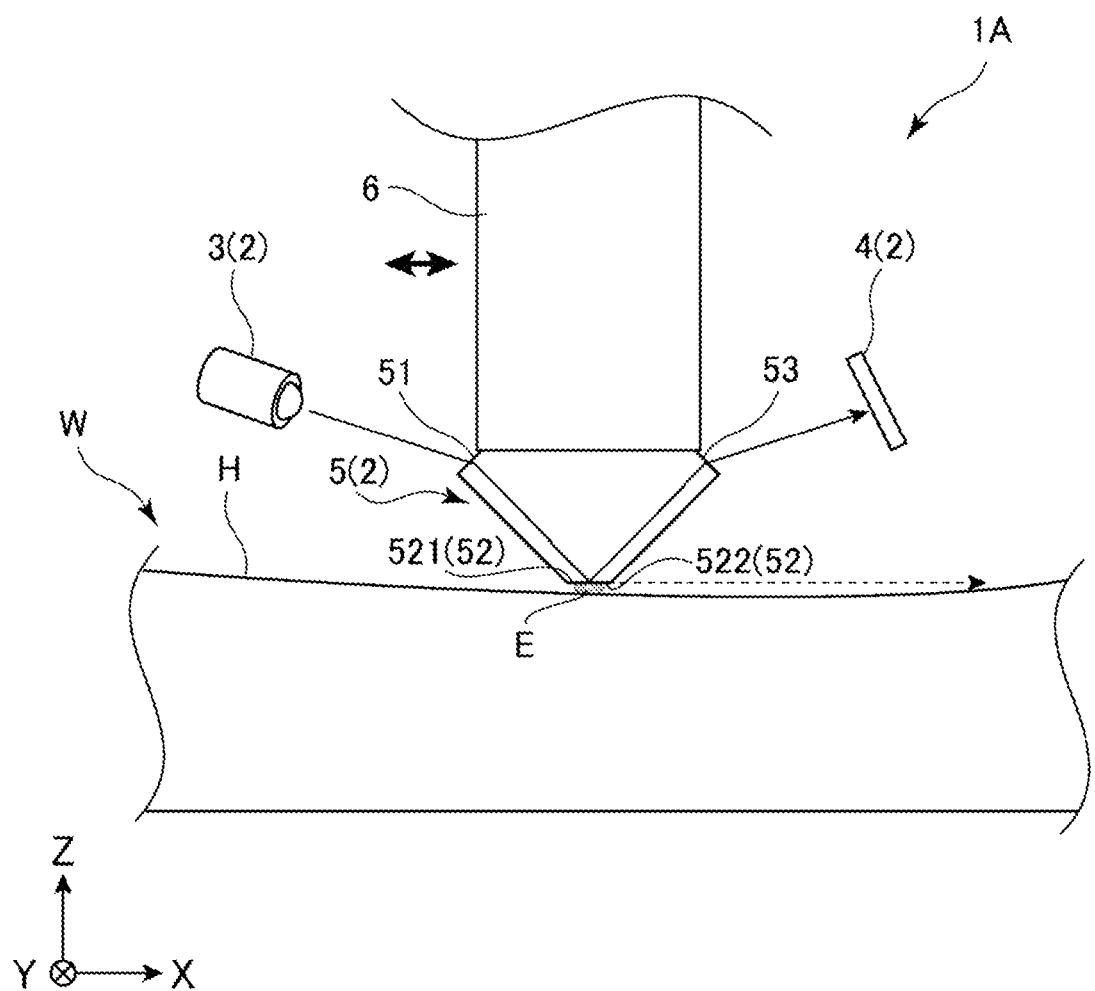
FIG. 5 illustrates a shape measuring apparatus according to a second embodiment of the present invention.
Figure 6:
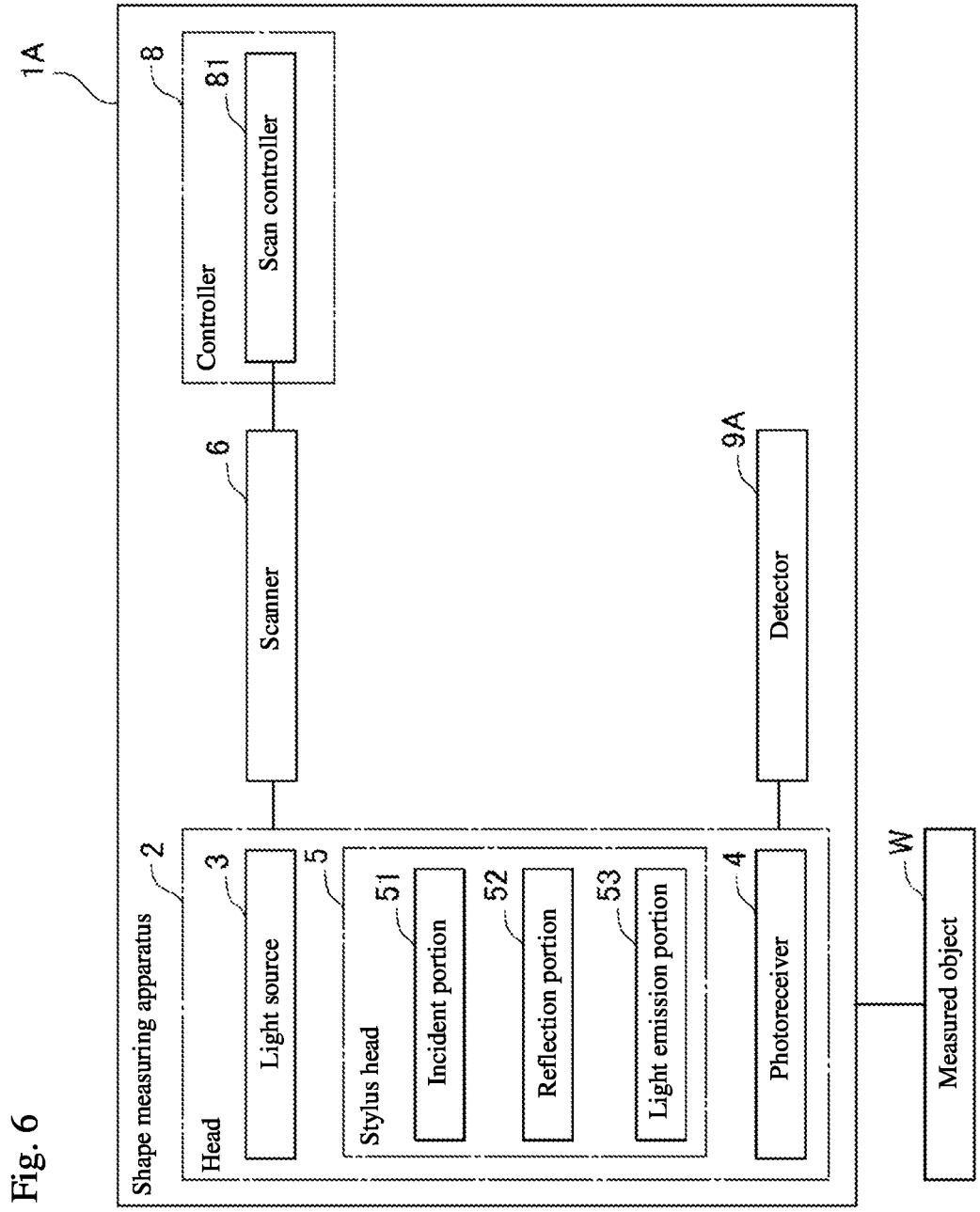
FIG. 6 is a block diagram of the shape measuring apparatus.
Figure 7:
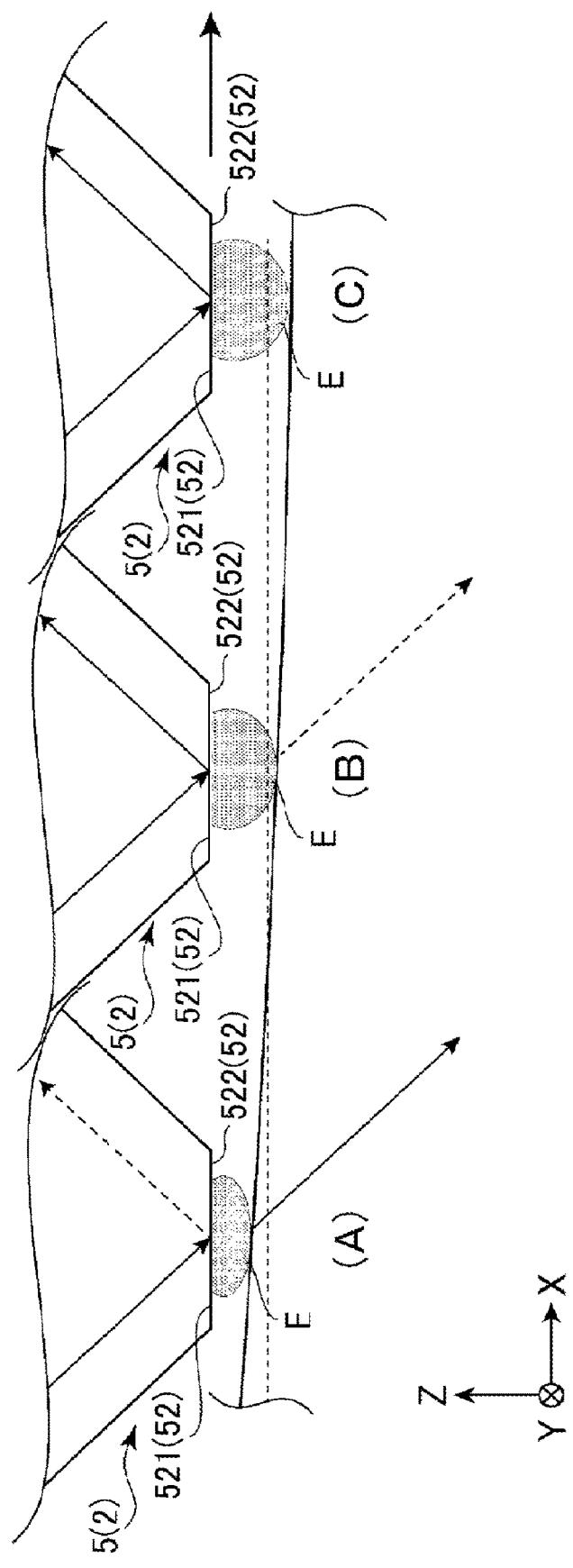
FIG. 7 is an enlarged view of a stylus head and the measured object according to the shape measuring apparatus.

Hereafter, a second embodiment of the present invention is described with reference to FIGS. 5 to 7. In the following description, those portions which have been previously described are assigned identical reference numerals and a description thereof is omitted. FIG. 5 illustrates a shape measuring apparatus 1A according to the second embodiment of the present invention, and FIG. 6 is a block diagram of the shape measuring apparatus 1A. Also, FIG. 7 is an enlarged view of the stylus head 5 and the measured object W according to the shape measuring apparatus 1A. Specifically, (A) in FIG. 7 illustrates when the separation distance between the measuring surface 522 and the surface H of the measured object W is narrow; (B) in FIG. 7 illustrates when the separation distance between the measuring surface 522 and the surface H of the measured object W is the predetermined value; and (C) in FIG. 7 illustrates when the separation distance between the measuring surface 522 and the surface H of the measured object W is large.

In the first embodiment, the shape measuring apparatus 1 includes the separation adjuster 7, the separation adjustment controller 82, and the feedback portion 83. Also, the detector 9 detects the shape of the surface H of the measured object W based on the displacement amount of the separation adjuster 7. As shown in FIGS. 5 and 6, the second embodiment is different from the first embodiment in that the shape measuring apparatus 1A is not provided with a separation adjuster, a separation adjustment controller, nor a feedback portion; and a detector 9A detects the shape of the surface H of the measured object W based on the intensity of the light received by the photoreceiver 4, which changes due to displacement of the head 2 by the scanner 6. At this time, the scanner 6 performs scans by displacing the head 2 in the X direction (serving as the predetermined scanning direction) using the scan controller 81.

As shown in FIG. 5, the light passing through the stylus head 5 which is received by the photoreceiver 4 changes in intensity based on a distance over which the evanescent light E reaches the surface H of the measured object W. In other words, the narrower the separation distance is between the measuring surface 522 of the stylus head 5 and the surface H of the measured object W, the greater the decrease in the intensity of the light that propagates and transits out to the measured object W from the stylus head 5 through the evanescent light E and that is received by the photoreceiver 4. The wider the separation distance is between the measuring surface 522 of the stylus head 5 and the surface H of the measured object W, the less light propagates through the evanescent light E to the measured object W from the stylus head 5 and the more the intensity of the light received by the photoreceiver 4 is increased compared to when the light propagates and transits out to the measured object W.

When a change in the shape of the surface H of the measured object W is in a range where the evanescent light E reaches the surface H of the measured object W, as shown in FIG. 7, by displacing the head 2 along the X direction (the predetermined scanning direction) using the scanner 6, the intensity of the light received by the photoreceiver 4 changes. Specifically, the narrower the separation distance is between the measuring surface 522 of the stylus head 5 and the surface H of the measured object W, the more light transits through the evanescent light E to the measured object W, as illustrated with a solid arrow in (A) of FIG. 7, and the more the intensity of the light received by the photoreceiver 4 is decreased. The greater the separation distance is between the measuring surface 522 of the stylus head 5 and the surface H of the measured object W, the less light transits through the evanescent light E to the measured object W at all, as illustrated with a dashed arrow in (B) or (C) of FIG. 7, and the more the intensity of the light received by the photoreceiver 4 is increased compared to (A) of FIG. 7. The detector 9A detects the shape of the surface H of the measured object W from the change of light intensity received by the photodetector 4 that is generated within the range where the evanescent light E reaches the surface H of the measured object W. Therefore, the shape measuring apparatus 1A can measure the shape of the surface H of the measured object W from the change of light intensity received by the photoreceiver 4 without adjusting the separation distance between the measuring surface 522 of the stylus head 5 and the surface H of the measured object W using the separation adjuster.

In the second embodiment described above, besides the effects and advantages similar to (1) and (4) according to the first embodiment, the following effects and advantages can also be achieved. (5) The shape measuring apparatus 1A can measure the shape of the surface H of the measured object W based on the light intensity without making contact with the surface H of the measured object W, simply by scanning the head 2 in the X direction (scanning direction) using the scanner 6, which performs scans by displacing relative to the head 2 having the stylus head 5 in the X direction (the predetermined scanning direction) with respect to the measured object W. (6) When the change in the shape of the surface H of the measured object W is within a range where the evanescent light E reaches the surface H, the separation adjuster 7 in the first embodiment is not necessary, and so costs can be reduced.

Modification of Embodiment

Moreover, the present invention is not limited to the above-described embodiments and includes modifications and improvements within a scope capable of achieving the advantages of the present invention. For example, in the respective embodiments described above, the shape measuring apparatuses 1 and 1A are the surface shape measuring apparatus. However, the shape measuring apparatus may be a coordinate measuring device, a roughness measuring device, or a roundness measuring device instead of the surface shape measuring apparatus. There is no particular limitation to what kind of measured object is measured by the shape measuring apparatus, and what kind of measuring method is used. Therefore, the head 2 according to the respective embodiments described above is displaced by the scanner 6 in the XY plane direction and is displaced by the separation adjuster 7 in the Z direction. However, a head may, for example, be provided to a foremost end of a manipulator and be provided to a shape measuring apparatus having at least three degrees of freedom. In the respective embodiments described above, the measured object W is translucent. However, a measured object need not be translucent and an arbitrary material may be used instead of glass. The shape measuring apparatus according to the present invention can be employed when it is not desired to have light enter inside the measured object, for example.

Also, in the respective embodiments described above, the shape of the surface H of a single measured object W is measured by displacing the head 2 and scanning using the scanner 6. However, the shape measuring apparatus may not be required to have the scanner and may instead limit the displacement in the XY direction without scanning with the head, and measure surfaces of a plurality of measured objects having an identical shape by merely adjusting the Z direction separation distance between the stylus head and the measured object using the separation adjuster. Specifically, a predetermined point or a plurality of points can be measured by interchanging a plurality of measured objects having an identical shape, and the shape measuring apparatus can measure whether a Z direction shape is uniform for each of the plurality of measured objects having the identical shape. The plurality of measured objects having the identical shape must each have an identical shape in the Z direction. If there is an error in the shape, the separation distance between the stylus head and the measured object is adjusted. Therefore, the shape measuring apparatus can measure whether the plurality of measured objects have the identical shape based on the displacement amount of the head in the Z direction using the separation adjuster.

In the respective embodiments described above, the shape measuring apparatuses 1 and 1A measure the shape of the surface H of the measured object W using the tunneling effect of the evanescent light E. However, the shape of a measured object may be measured using any method, without the tunneling effect, as long as the shape of the measured object can be measured using evanescent light. In short, the stylus head of the shape measuring apparatus is arranged so as to separate the measuring surface from the surface of the measured object and also such that the evanescent light, which is generated at the measuring surface in a direction toward the opposite side from the total reflection surface, reaches the surface of the measured object. The detector only needs to be able to detect the shape of the measured object based on the changes in the light received by the photoreceiver and caused by the evanescent light that reaches the surface of the measured object.

In the first embodiment, the predetermined value is, as shown in FIG. 3A, the intensity of the light received by the photoreceiver 4 when the small amount of light (illustrated in the dashed arrow) among the light totally reflected by the total reflection surface 521 propagates and transits through the evanescent light E to the measured object W because of the tunneling effect. However, a state in which light does not travel to the measured object may be defined as a predetermined value, and how the predetermined value is defined is a design matter.

Figure 8:
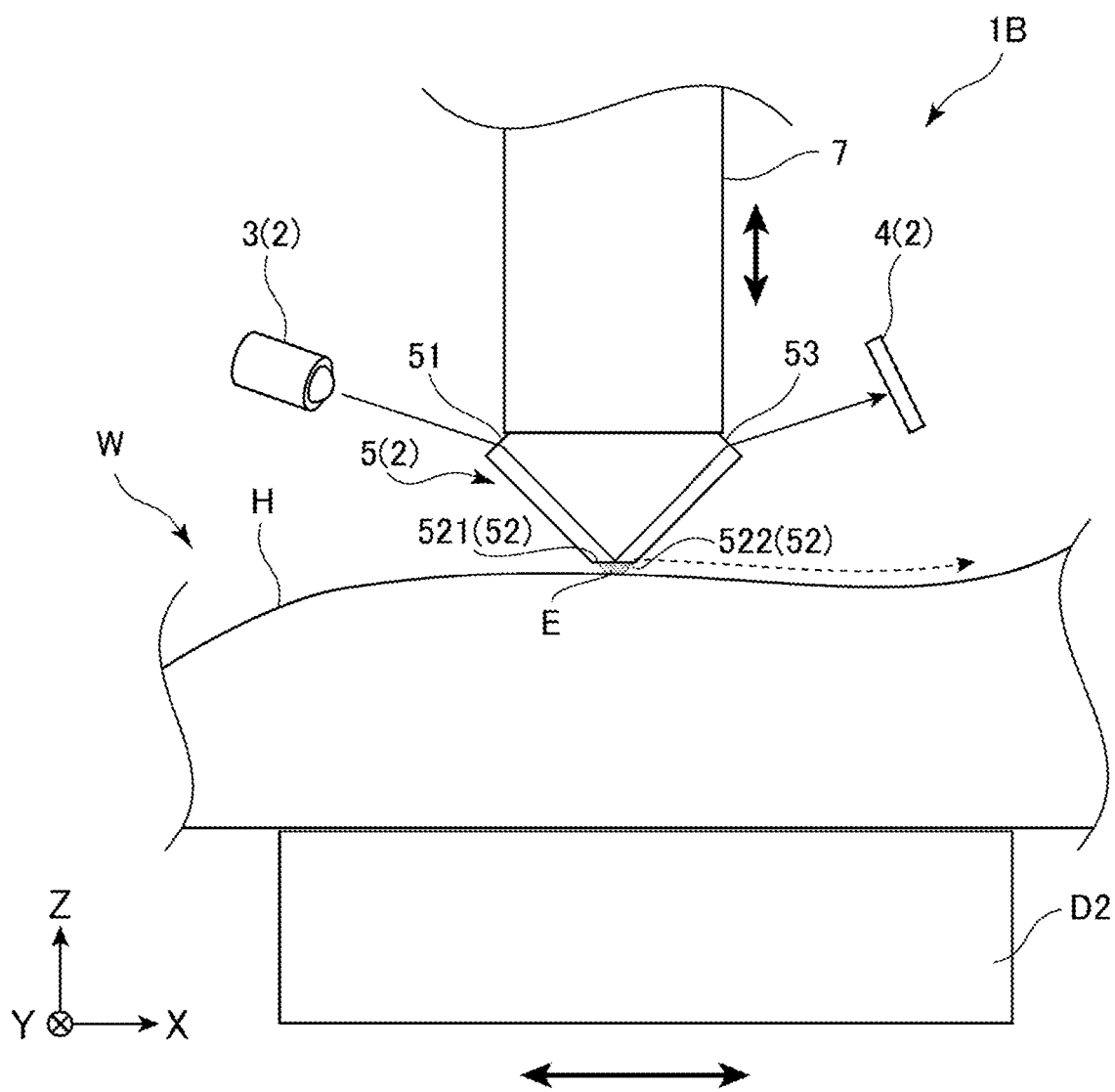
FIG. 8 illustrates a shape measuring apparatus according to a modification.
Figure 9:
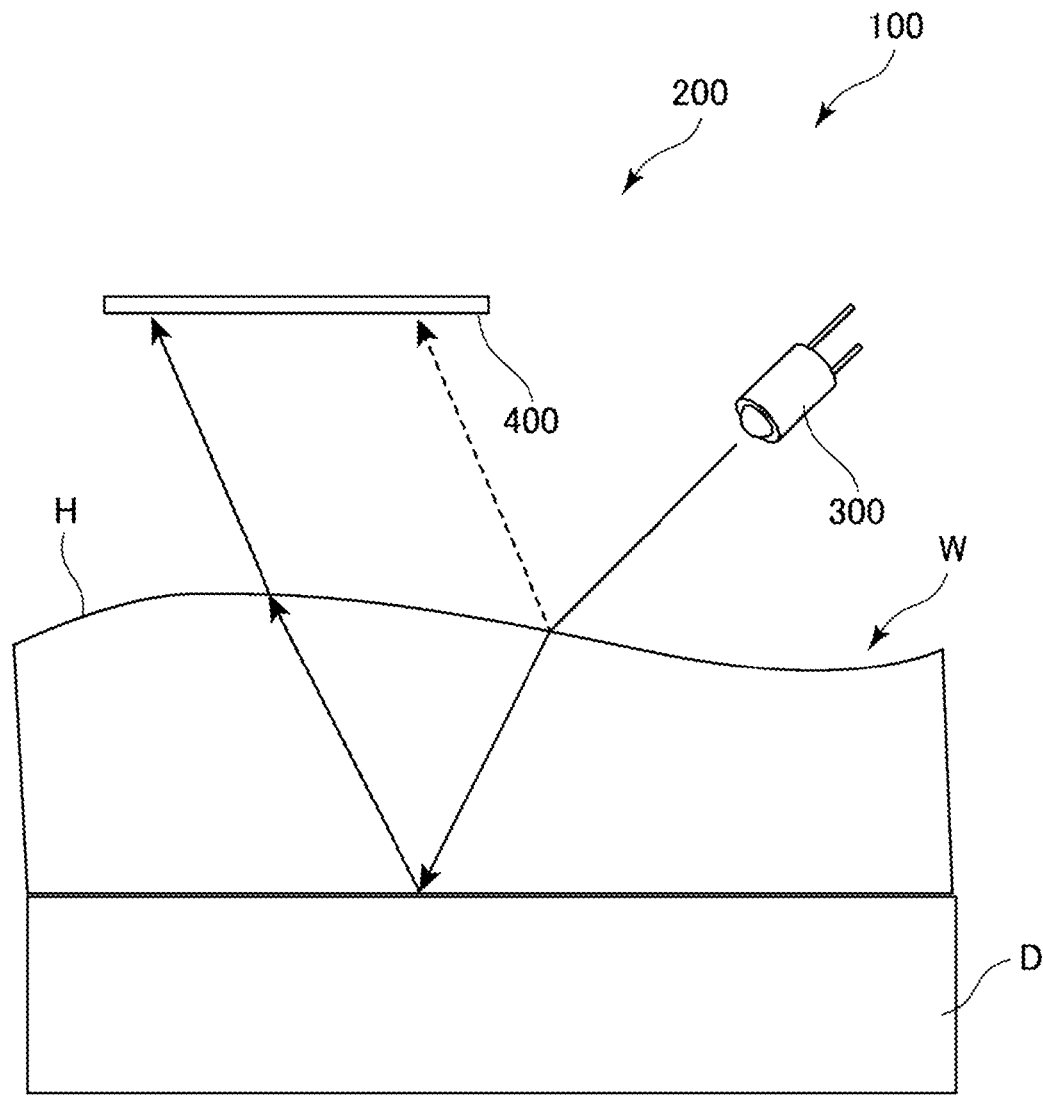
FIG. 9 illustrates a conventional shape measuring apparatus.

FIG. 8 illustrates a shape measuring apparatus 1B according to a modification. In the respective embodiments described above, the shape of the surface H of the measured object W is measured without a measurement stand. As shown in FIG. 8, the shape measuring apparatus 1B according to the modification is different from the respective embodiments noted above in that the shape measuring apparatus 1B includes a measurement stand D2 that is capable of displacement in the X and Y directions (directions parallel to the surface H of the measured object W) and serves as the scanner. In the respective embodiments described above, the scanner 6 displaces the head 2 with respect to the measured object W using the scan controller 81. However, the scanner may displace the head side as in the above embodiments, or may relatively displace the measured object with respect to the head. In other words, the scanner may be relatively displaced in any way as long as the scanner can scan by displacing relative to the measured object and the head in the predetermined scanning direction. Also, the separation adjuster 7 according to the first embodiment controls the displacement of the head 2 using the separation adjustment controller 82 in order to adjust separation by displacing the head 2 from the surface H of the measured object W in the Z direction in accordance with the predetermined value of the intensity of the light received by the photoreceiver 4. However, the separation adjuster may serve as the measurement stand and the separation adjustment controller may adjust separation by displacing the head from the surface of the measured object in the Z direction by controlling the measurement stand.

Therefore, the displacement of the head in the XYZ directions is limited, the scan controller may scan by causing displacement in the X and Y directions by controlling the measurement stand D2 serving as the scanner and by displacing relative to the measured object with respect to the head in the predetermined scanning direction, and the separation adjustment controller may adjust separation between the measuring surface of the stylus head and the surface of the measured object by relatively displacing the head with respect to the measured object in the Z direction by controlling the measurement stand D2 serving as the separation adjuster. In addition, the separation adjustment and relative displacement between the measured object and the head may also be performed manually, and the shape measuring apparatus is not required to have the scanner and the separation adjuster. In summary, the shape measuring apparatus only needs to be able to detect the shape of the surface of the measured object based on the changes in the light received by the photoreceiver and caused by the evanescent light that reaches the surface of the measured object.

As noted above, the present invention can be utilized favorably with a shape measuring apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A shape measuring apparatus comprising:
   a head comprising:
      a light source that emits light toward a surface of a measurable object;
      a photoreceiver that is integrally displaceable with the light source and receives light through the surface of the measurable object; and
      a translucent stylus head positioned between the light source and the photoreceiver and which is integrally displaceable with the light source and the photoreceiver, the translucent stylus head comprising:
         an incident portion that causes the light from the light source to be incident on an interior of the translucent stylus head;
         a reflection portion that totally reflects the incident light from the incident portion, the reflection portion including a total reflection surface that totally reflects the light from the light source and a measurement surface on the opposite side from the total reflection surface, arranged facing the surface of the measurable object; and a light emission portion that emits the light that is totally reflected by the reflection portion toward the photoreceiver, wherein the translucent stylus head is arranged such that:
the measurement surface is separated from the surface of the measurable object, and
evanescent light that is generated at the measurement surface in a direction toward the opposite side from the total reflection surface reaches the surface of the measurable object; and
a detector that detects a shape of the surface of the measurable object based on changes in light received by the photoreceiver and caused by the evanescent light that reaches the surface of the measurable object.

2. The shape measuring apparatus according to claim 1, further comprising:
a controller that controls relative displacement of the measurable object and the head; and
a scanner that scans by displacing the head relative to the measurable object in a predetermined scanning direction, wherein:
the controller comprises a scan controller that controls the scanner, and
the detector detects the shape of the surface of the measurable object based on the intensity of the light received by the photoreceiver.

3. The shape measuring apparatus according to claim 1, further comprising:
a controller that controls relative displacement of the measurable object and the head; and
a separation adjuster that adjusts separation between the measurement surface of the translucent stylus head and the surface of the measurable object by displacing the head relative to the measurable object, wherein:
the measurable object is translucent;
the controller comprises:
a separation adjustment controller that controls the separation adjuster; and
a feedback portion that feeds the intensity of the light received by the photoreceiver back to the separation adjustment controller;
the separation adjustment controller adjusts separation between the measurement surface and the surface of the measurable object by:
controlling the separation adjuster such that the intensity of the light received by the photoreceiver is maintained at a predetermined value by displacing the head in a direction away from the surface of the measurable object when the intensity of the light received by the photoreceiver is lower than the predetermined value, and
displacing the head in a direction approaching the surface of the measurable object when the intensity of the light received by the photoreceiver is greater than the predetermined value, and
the detector detects the shape of the surface of the measurable object based on a displacement amount of the separation adjuster with respect to the surface of the measurable object.

4. The shape measuring apparatus according to claim 2, further comprising a separation adjuster that adjusts separation between the measurement surface of the translucent stylus head and the surface of the measurable object by displacing the head relative to the measurable object, wherein:
the measurable object is translucent;
the controller comprises:
a separation adjustment controller that controls the separation adjuster; and
a feedback portion that feeds the intensity of the light received by the photoreceiver back to the separation adjustment controller;
the separation adjustment controller adjusts separation between the measurement surface and the surface of the measurable object by:
controlling the separation adjuster such that the intensity of the light received by the photoreceiver is maintained at a predetermined value by displacing the head in a direction away from the surface of the measurable object when the intensity of the light received by the photoreceiver is lower than the predetermined value, and
displacing the head in a direction approaching the surface of the measurable object when the intensity of the light received by the photoreceiver is greater than the predetermined value, and
the detector detects the shape of the surface of the measurable object based on a displacement amount of the separation adjuster with respect to the surface of the measurable object.

5. The shape measuring apparatus according to claim 1, wherein the light source is a laser light source that emits laser light.

6. The shape measuring apparatus according to claim 2, wherein the light source is a laser light source that emits laser light.

7. The shape measuring apparatus according to claim 3, wherein the light source is a laser light source that emits laser light.

8. The shape measuring apparatus according to claim 4, wherein the light source is a laser light source that emits laser light.

* * * * *